US009601154B2

(12) United States Patent
Zhu et al.

(10) Patent No.: US 9,601,154 B2
(45) Date of Patent: Mar. 21, 2017

(54) PRIORITIZED RANDOM ACCESS FOR MAGNETIC RECORDING

(71) Applicant: Seagate Technology LLC, Cupertino, CA (US)

(72) Inventors: Wenzhong Zhu, Apple Valley, MN (US); Kaizhong Gao, North Oaks, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/699,834

(22) Filed: Apr. 29, 2015

(65) Prior Publication Data

US 2016/0148644 A1 May 26, 2016

Related U.S. Application Data (60) Provisional application No. 62/097,416, filed on Dec. 29, 2014, provisional application No. 62/083,696, filed on Nov. 24, 2014, provisional application No. 62/083,732, filed on Nov. 24, 2014.

(51) Int. Cl.
*G11B 20/12* (2006.01)
*G06F 12/02* (2006.01)
*G11B 5/012* (2006.01)

(52) U.S. Cl.
CPC ...... *G11B 20/1217* (2013.01); *G06F 12/0238* (2013.01); *G06F 2212/1044* (2013.01); *G06F 2212/152* (2013.01); *G06F 2212/21* (2013.01); *G06F 2212/70* (2013.01); *G11B 5/012* (2013.01); *G11B 2020/1238* (2013.01); *G11B 2020/1292* (2013.01)

(58) Field of Classification Search
CPC ......... G11B 7/1263; G11B 5/09; G11B 5/746; G11B 2005/0021; G11B 20/1217; G11B 2020/1238; G11B 2020/1292; G11B 5/012; G06F 12/0238; G06F 2212/1044; G06F 2212/152; G06F 2212/21; G06F 2212/70
USPC .......................................................... 360/53
See application file for complete search history.

(56) References Cited

U.S. PATENT DOCUMENTS

| | | | |
|---|---|---|---|
| 4,030,130 A | 6/1977 | Smith | |
| 4,298,897 A | 11/1981 | Arter et al. | |
| 4,535,372 A | 8/1985 | Yeakley | |
| 4,622,601 A | 11/1986 | Isozaki et al. | |
| 4,646,168 A | 2/1987 | Sonobe et al. | |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Ali Neyzari
(74) *Attorney, Agent, or Firm* — Holzer Patel Drennan (57) ABSTRACT

A storage device includes a controller that directs incoming data to a storage location based on a capacity of a region or surface of a magnetic disc. According to one implementation, the storage device controller writes new data to data tracks in a first series of data tracks on the magnetic disc until a capacity condition is satisfied. Once the capacity condition is satisfied, the storage device controller writes new data to a second series of data tracks on the storage medium that are interlaced with data tracks of the first series.

19 Claims, 10 Drawing Sheets

(56) References Cited

U.S. PATENT DOCUMENTS

| | | |
|---|---|---|
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2015/0178161 A1 | 6/2015 | Burd et al. |
| 2016/0148630 A1 | 5/2016 | Rausch |
| 2016/0148635 A1* | 5/2016 | Zhu ................ G11B 7/1263 369/13.26 |
| 2016/0148636 A1 | 5/2016 | Ma et al. |
| 2016/0148637 A1* | 5/2016 | Rausch ................ G11B 5/09 369/13.26 |
| 2016/0148642 A1 | 5/2016 | Gao |
| 2016/0148643 A1* | 5/2016 | Gao ................ G11B 20/1217 369/13.35 |
| 2016/0148644 A1 | 5/2016 | Zhu et al. |
| 2016/0148645 A1* | 5/2016 | Zhu ................ G11B 20/1217 711/4 |

FOREIGN PATENT DOCUMENTS

| | | |
|---|---|---|
| JP | 02240862 A | 9/1990 |
| WO | 2005-030869 A1 | 4/2005 |

* cited by examiner

PRIORITIZED RANDOM ACCESS FOR MAGNETIC RECORDING

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/097,416, entitled "Prioritized Random Access for Magnetic Recording" and filed on Dec. 29, 2014. Each of these applications is specifically incorporated by reference for all that it discloses or teaches.

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. Both of these applications are specifically incorporated by reference for all that they disclose or teach.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

Therefore, better designs are desired to increase storage device performance while achieving or improving upon the ADC of existing SMR systems.

SUMMARY

Implementations disclosed herein provide for a storage device controller configured to write new data to data tracks in a first series of data tracks on a storage medium until a first capacity is satisfied. Once the capacity condition is satisfied, the storage device controller writes new data to data tracks in a second series of data tracks on the storage medium. Each of the data tracks of the second series of data tracks is interlaced between data tracks of the first series.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
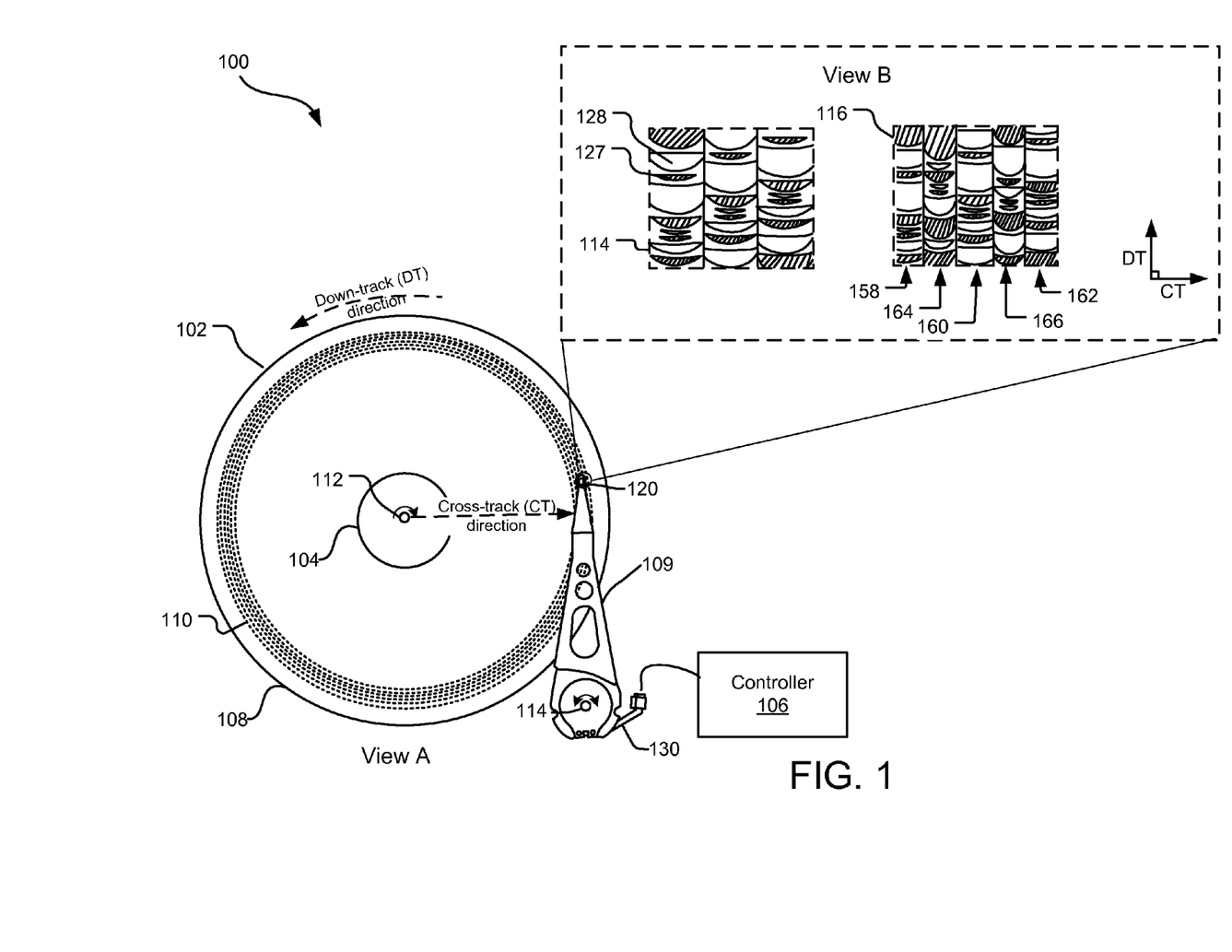
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

The transducer head assembly 120 includes at least one write element (not shown) that further includes a write pole for converting a series of electrical pulses sent from a controller 106 into a series of magnetic pulses of commensurate magnitude and length. The magnetic pulses of the write pole selectively magnetize magnetic grains of the rotating magnetic media 108 as they pass below the pulsating write element.

View B illustrates magnified views 114 and 116 of a same surface portion of the storage media 108 according to different write methodologies and settings of the data storage device 100. Specifically, the magnified views 114 and 116 include a number of magnetically polarized regions, also referred to herein as "data bits," along the data tracks of the storage media 108. Each of the data bits (e.g., a data bit 127) represents one or more individual data bits of a same state (e.g., 1s or 0s). For example, the data bit 128 is a magnetically polarized region representing multiple bits of a first state (e.g., "000"), while the adjacent data bit 127 is an oppositely polarized region representing one or more bits of a second state (e.g., a single "1"). The data bits in each of the magnified views 114 and 116 are not necessarily illustrative of the actual shapes or separations of the bits within an individual system configuration.

The magnified view 114 illustrates magnetic transitions recorded according to a conventional magnetic recording (CMR) technique. In a CMR system, all written data tracks are randomly writeable and of substantially equal width.

According to one implementation, aspects of the disclosed technology are implemented in a CMR system to improve drive performance. In particular, certain aspects of the disclosed technology provide for directed writes to specific data tracks based on a drive or region capacity. The same or other aspects of the disclosed technology may also be implemented in non-CMR systems such as an interlaced magnetic recording (IMR) system exemplified in the magnified view 116.

The IMR system shown in the magnified view 116 illustrates alternating data tracks of two different written track widths. A first series of alternating tracks (e.g., the tracks 158, 160, and 162) have a wider written track width than a second series of interlaced data tracks (e.g., 164 and 166). In one implementation, each data track of the first series of alternating data tracks (e.g., the data track 160) is written before the immediately adjacent data tracks of the second series (e.g., 164 and 166).

According to one implementation, data of the second series (e.g., 164, 166) is of a lower linear density (e.g., along-track density) than data of the first series (e.g., 158, 160, and 162). Other implementations utilize more than two different linear densities to write data. The IMR technique illustrated in the magnified view 116 provides for a higher total areal density capability (ADC) with a lower observable bit error rate (BER) than CMR systems.

To write new data to the magnetic storage medium 108, a storage controller 106 of the storage device 100 selects a storage location based according to a number of prioritized random access (PRA) rules. For example, the controller 106 selects storage locations for each incoming write command to systematically maximize a total number of possible random writes, to improve drive performance, etc. If the system 100 is a CMR system, the storage controller 106 may write data tracks in an order that maximizes a number of random writes on the storage medium 108. If the system 100 is an IMR system, the storage controller 106 may write to different (e.g., interlaced) data tracks on the magnetic storage medium 108 with different linear densities and written track widths.

In at least one implementation, the storage medium 108 is divided radially into zones and each zone is associated with multiple linear densities and/or written track widths. For example, two or more different linear densities may be used to write data of alternating tracks within each individual radial zone. The linear densities employed in one radial zone may differ from the linear densities employed in any other radial zone of the storage medium 108.

The controller 106 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
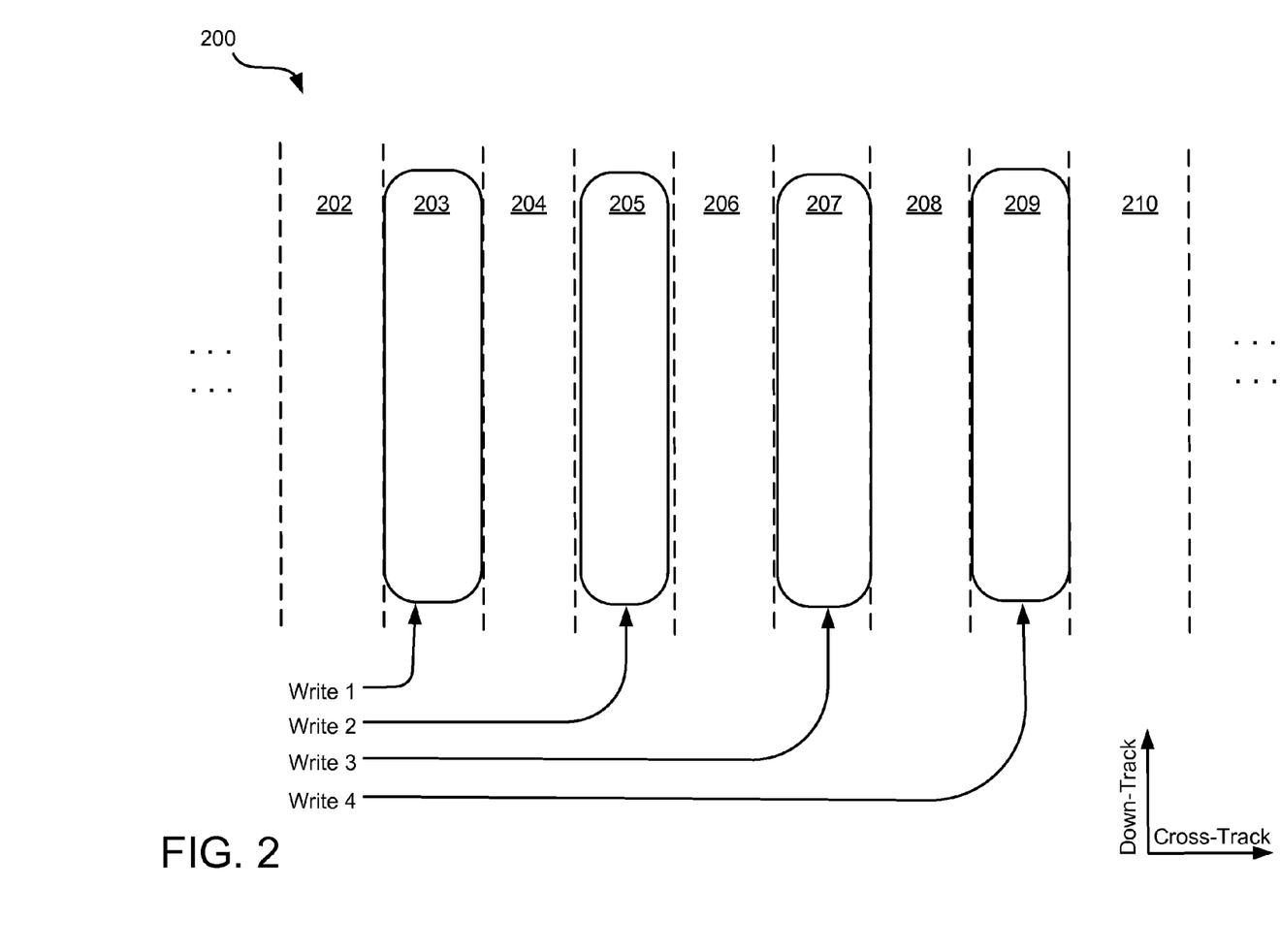
FIG. 2 illustrates data writes to a magnetic disc employing an example prioritized random access (PRA) write scheme in a conventional magnetic recording system.

FIG. 2 illustrates data writes in magnetic disc 200 employing an example PRA write scheme in a CMR system. The magnetic disc 200 includes a number of substantially circular data tracks (e.g., data tracks 202, 210). A controller (not shown) selects data tracks to receive and store incoming data. For each write operation, the controller identifies relevant PRA rules and executes the write operation in a manner that satisfies the identified PRA rules.

In general, PRA rules define a write priority among data in various data tracks. In the example of FIG. 2, an example implemented PRA rule specifies that every-other data track is left blank for a period of time as the magnetic disc 200 begins to fill up with data. In one implementation, new data is written to alternating data tracks (as shown) until a capacity condition is satisfied. A capacity condition may be, for example, a set capacity of the magnetic storage medium of a radial zone on the medium (e.g., 50% or more). In other implementations, PRA rules may apply other capacity conditions. For example, one PRA rule specifies that data can be written to data track 204 as soon as data is written to the data tracks 203 and 205.

One advantage to writing data exclusively to alternating data tracks (as shown) is that a risk of adjacent track interference (ATI) (also referred to as adjacent track erasure (ATE)) is substantially eliminated. For example, a write of new data to a data track 205 cannot interfere with data in the adjacent tracks 204 and 206 if those adjacent tracks are left blank (as shown).

In some perpendicular recording devices, a wide write field generated by a write head causes side track erasure (STE). STE refers to the erasure of data on a data track that is not immediately adjacent to the data track subject to a write operation causing the erasure. For example, STE may refer to erasure of data in the data track 206 during a write operation to the data track 204. The effect of STE is prevalent in a variety of types of storage devices, but does not exist in heat-assisted magnetic recording (HAMR) devices. Therefore, the illustrated implementation (which eliminates ATI) is particularly useful when used in conjunction with a HAMR storage device (which further eliminates STE).

Some recording devices regularly perform certain processing operations to monitor data degradation attributable to ATI and STE. For example, a storage device controller may regularly read back data tracks or data segments to measure degradation of the stored data. In general, a small degree of data degradation may be acceptable if the data is repairable via an error correction code (ECC) of the storage device. However, if the degradation becomes too severe, the ECC may be unable to repair the data.

In one implementation, a storage device controller initiates a direct offline scan (DOS) of a data track after a particular number of data writes to an immediately adjacent or nearby data track. A DOS is an example post-write scan operation also referred to as a defective data scan. The purpose of the DOS is to measure degradation to a particular data track, such as degradation that is due to ATI and STE. During the DOS, data is read back from a data track on storage medium 200. The ECC repairs errors in the data to the extent possible, and counts a number of correctable read errors. If the number of correctable read errors exceeds a threshold, the storage device controller may elect to re-write the data of that data track before the data degradation becomes more severe. For example, a DOS may be initiated to read back the data tracks 202 and/or 204 after the data track 203 is been updated X number of times (e.g., 5 times) without re-writing the data of the data tracks 202 and 204. If the DOS indicates that the data tracks 202 and/or 204 are significantly degraded, a storage controller may re-write the data tracks 202 and 204.

Due to significant processing overhead, regular and frequent DOS operations reduce device performance. One implementation of the disclosed technology improves device performance by reducing a total number of DOSs that are performed while still ensuring a sufficient level of stored data integrity. As discussed above, the illustrated write methodology (e.g., writing data to every other data track) eliminates the risk of ATI during each write operation. Therefore, DOSs can be performed less frequently or not at all in this system during a period of time where data is written exclusively to every other data track (as shown).

In FIG. 2, the data tracks each have an identical written track width. However (as will be discussed in greater detail below), this write methodology may also be applicable to non-conventional magnetic recording systems such as IMR systems.

In one example of the above-described write methodology, data is written to alternating data tracks across entire surface of the storage media 200 before any data is written to the interlaced tracks between the alternating data tracks. During this time, post-write scan operations are disabled. Once a capacity condition is satisfied (e.g., sized of stored data is approximately 50% of a disc capacity), the post-write scan operations (e.g., DOS operations) are enabled.

Post-write scan operations include, for example, enabling a write counter in association with a particular data track; initiating a DOS of a data track whenever the associated write counter satisfies a counter threshold; re-writing the data track if the DOS indicates the data track is significantly degraded; and resetting the write counter for the data track when the data track is re-written.

When post-write scan operations are enabled, a write operation to any particular data track increases a write counter associated with nearby (e.g., immediately adjacent) data tracks. For example, a write operation directed to the data track 204 increases a write counter associated with the data tracks 203 and 205. The more times that the data track 204 is written to, the more likely it is that data is corrupted on the adjacent data tracks 203 and 205.

When the write counter for a particular data track exceeds a threshold, the data track is subjected to a DOS. For example, the data track 203 may be subjected to a DOS if an associated write counter exceeds a threshold value. The DOS scans the data track 203, and determines whether a number of correctable read errors satisfies an error threshold. If the number of correctable read errors satisfies the error threshold, the storage device controller re-writes the data of the data track 203 and resets the write counter of the data track 203 to a default starting value.

In one implementation, the write methodology illustrated in FIG. 2 is implemented within a particular radial zone of disc. For example, a storage device controller may use such methodology when writing data to a high performance radial zone near the outer diameter of the storage media 200 but not while writing data to a lower performance radial zone near the inner diameter.

Figure 3:
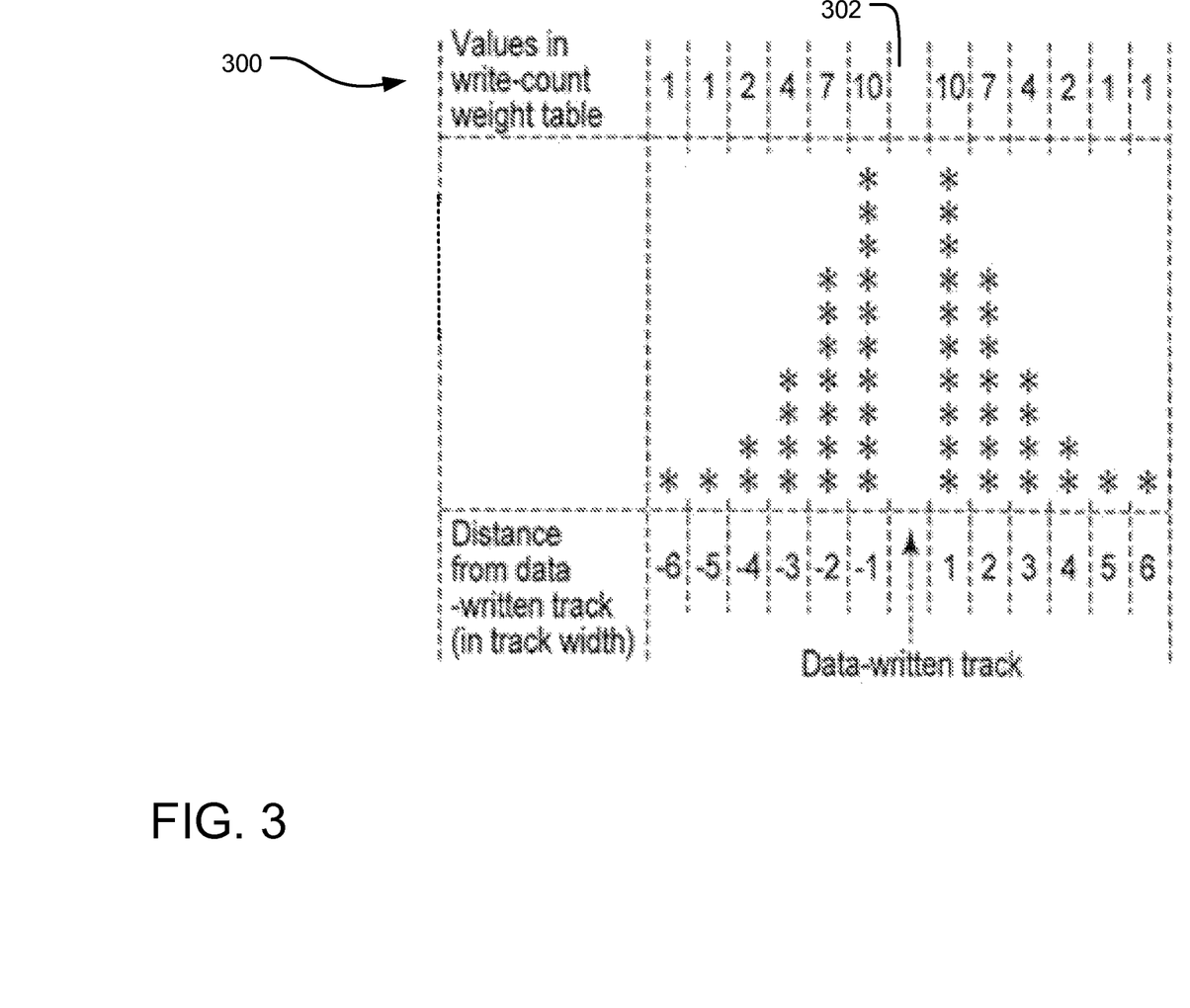
FIG. 3 illustrates incrementing of write counters for various data tracks responsive to a data write to a central data track.

In some implementations, incrementing a write counter entails scaling an entire affected region (e.g., more than just immediately adjacent tracks) by a scalar value to obtain a new increment write count. For example, FIG. 3 illustrates incrementing of example write counters 300 for various data tracks responsive to a data write to a central data track 302. Since the data tracks closest to the central data track 302 are at a highest risk of ATI and STE (e.g., if the storage drive is a non-HAMR drive), the write counter for each of the data tracks increments in proportion to a distance from the central data track 302 where the data is written. For example, write counters for the data tracks immediately adjacent to the central data track 302 increment by 10; write counters for the data tracks two tracks away from the central data track 302 increment by 7; write counters for the data tracks three tracks away from the central data track 302 increment by 4, etc.

A variety of other scaling techniques are also contemplated in addition to that illustrated by FIG. 3. In one implementation, a data write to a particular data track increments write counters associated with 100 adjacent tracks (e.g., −50 tracks and +50 tracks from the central track 302). When the write counter for any particular data track exceeds a predetermined threshold, that data track is subjected to a DOS. The DOS scans data of the data track, and determines whether a number of correctable read errors satisfies an error threshold. If the number of correctable read errors satisfies the error threshold, the storage device controller re-writes the data of that data track and resets the write counter of the data track to a default starting value. In one implementation, write counters are not incremented until capacity of a magnetic disc satisfies a capacity condition, such as 50% region or disc capacity.

Figure 4:
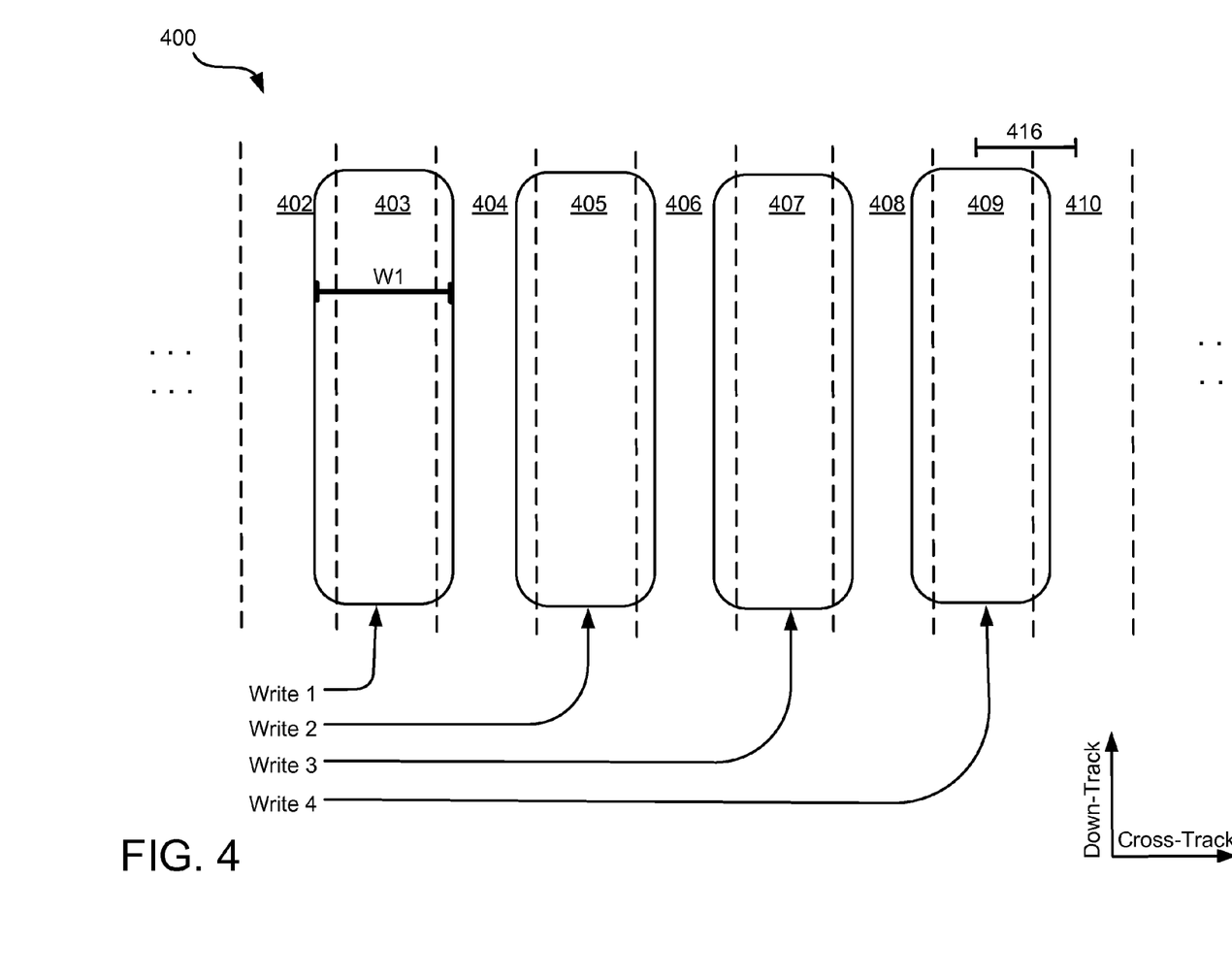
FIG. 4 illustrates data writes to a magnetic disc in an interlaced magnetic recording (IMR) system.

FIG. 4 illustrates example data writes in an IMR system. The magnetic disc 400 includes a number of substantially circular data tracks (e.g., data tracks 402-410). A controller (not shown) selects data tracks to receive and store incoming data.

In FIG. 4, the dotted lines indicate boundaries between adjacent data tracks having a same track pitch 416 (e.g., distance between centers of adjacent data tracks). In one implementation, a same or substantially equal track pitch is employed across an entire surface of the magnetic disc 400. However, the track pitch 416 of each data track is smaller than a written track width (W1), (e.g., an actual width of recorded data bits in the cross-track direction) for data written to a first plurality of alternating data tracks 404, 405, 407, and 409.

In various implementations, the first plurality of alternating data tracks (e.g., 404, 405, 407, and 409) includes either exclusively even-numbered tracks or exclusively odd-numbered tracks. Tracks interlaced with the first plurality of alternating data tracks have a narrower written track width (e.g., less than W1) and, by convention, overwrite the edges of data bits stored in the immediately adjacent to data tracks of wider written width.

To simplify nomenclature, the first plurality of data tracks (e.g., those tracks written with a wider bit footprint) are shown and are also referred to herein as "odd-numbered" data tracks. It should be understood, however, that the odd-numbered tracks may, in practice, be even-numbered tracks and vice versa. In at least one implementation, the interlaced (e.g., odd-numbered) data tracks are written with a higher linear density than the even-numbered data tracks.

In one implementation, data is written to alternating data tracks in a region of the storage media 400 before any data is written to the interlaced tracks between the alternating data tracks. In FIG. 4, the data tracks of wider written track width (404, 405, 407, 409) are written to before the interlaced tracks of narrower written track width (e.g., 402, 404, 406, 408, and 410). So long as there is a spacing (e.g., a blank track) between each data track including data, there is no risk of data loss due to ATI.

As discussed above with respect to FIG. 2, this type of write methodology allows for disabling of post-write scan operations for a period of time as the magnetic disc 400 begins to fill up. Once the magnetic disc 400 or a particular radial zone of the disc 400 reaches a predetermined capacity (e.g., satisfies a capacity condition), the post-write scan operations are enabled. While the post-write scan operations are enabled, a write operation to any particular data track increases a write counter associated with two or more adjacent data tracks.

When the write counter for any particular data track exceeds a predetermined threshold, that data track is subjected to a DOS. The DOS scans data of the data track and determines whether a number of correctable read errors satisfies an error threshold. If the number of correctable read errors satisfies the error threshold, the storage device controller re-writes the data of that data track and resets the write counter of the data track to a default starting value.

The illustrated write methodology may be used to write data to an entire surface of the magnetic disc 400 or one or more individual radial zone on the magnetic disc 400. The capacity condition for enabling the post-write DOS scan for a particular region (e.g., the radial zone or surface of the magnetic disc 400) may be satisfied when, for example, a size of data stored in the region is 50-65% of a total capacity of the region. In IMR systems, capacity within a region can be unevenly distributed between consecutive data tracks (e.g., if the various data tracks store data of different respective linear densities). Therefore, a region on the magnetic disc 200 may store greater than 50% of the total capacity of the region without storing any data in the blank, interlaced data tracks (e.g., 402, 404, 406, etc.).

In one implementation, the storage device controller sequentially writes data to the alternating data tracks 403, 405, 407, 409, etc. as indicated by the notation "write 1", "write 2", "write 3", and "write 4" at the bottom of FIG. 4. In another implementation, writes to the alternating data tracks 403, 405, 407, 409, etc. are in a different order.

In an implementation where post-write scan operations are disabled during writes to alternating data tracks (as discussed above), device performance improves as compared to an implementation that performs one or more post-write scan operations (e.g., incrementing a write counter) after every write operation to allow for periodic integrity checks of stored data The illustrated write methodology also has the added benefit of permitting all write operations to be performed at random until the point in time where the storage device controller begins to write data to the interlaced (e.g., even-numbered) data tracks.

Other implementations of the disclosed technology, discussed below, utilize other PRA rules for data management. These rules may be utilized alone or in conjunction with the post-write DOS disabling rule discussed above.

Figure 5:
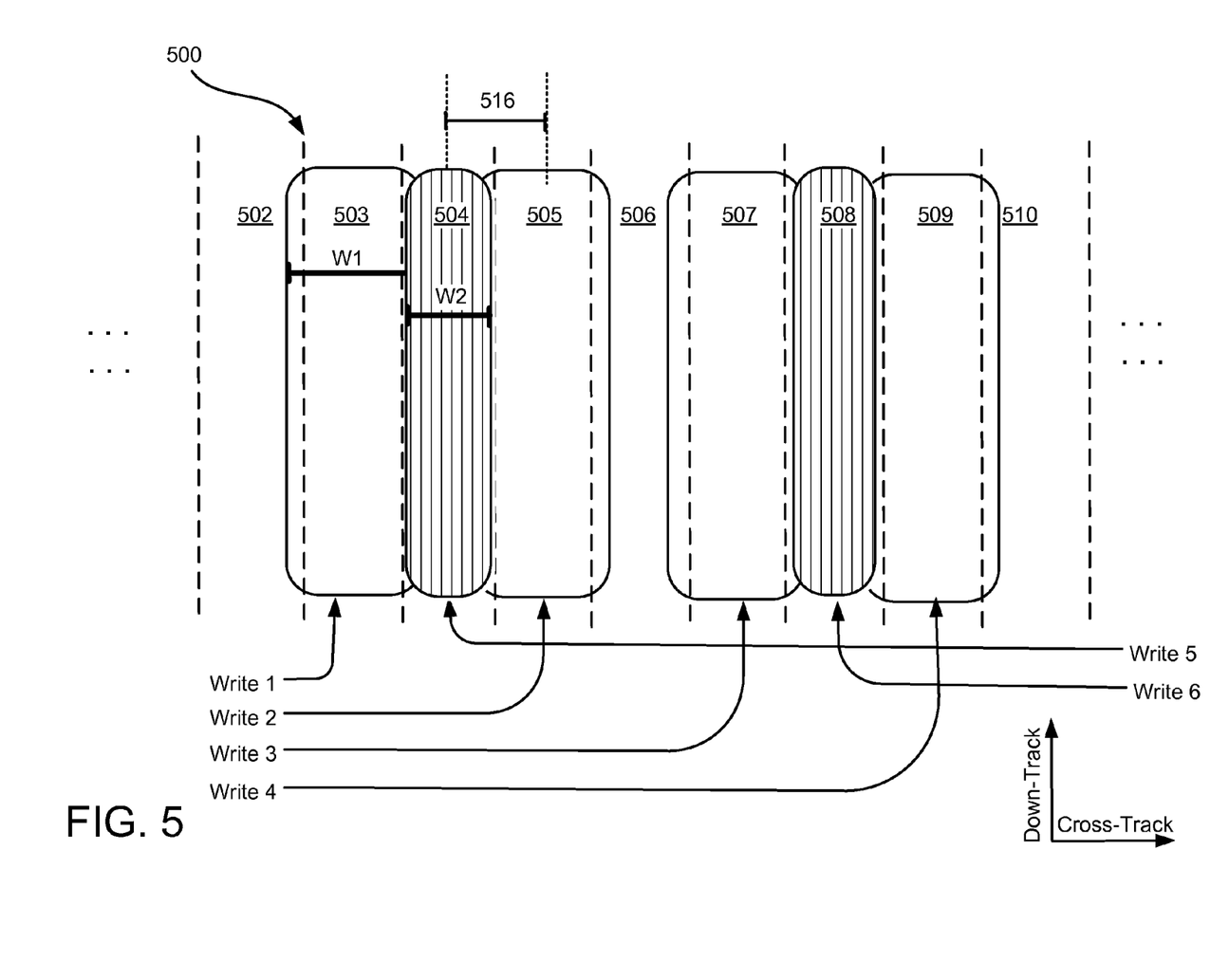
FIG. 5 illustrates data writes to a magnetic disc employing another example PRA scheme in an IMR system.

FIG. 5 illustrates example data writes to a magnetic disc 500 employing another PRA scheme in an IMR system. The magnetic disc 500 includes a number of circular data tracks (e.g., data tracks 502-510). A controller (not shown) selects data tracks to receive and store incoming data. In one implementation, the controller directs the incoming data writes to a series of alternating data tracks (e.g., odd-numbered data tracks 503, 505, 507, and 509) for a period of time until a first capacity condition is satisfied. During this time period, data tracks interlaced (e.g., the even-numbered data tracks) with the alternating data tracks are left blank.

In FIG. 5, a written track width W2 of the even-numbered data tracks is less than or approximately equal to a defined track pitch 516 (e.g., a spacing between a center of an even-numbered data track and an adjacent odd-numbered data track). A written track width W1 of the odd-numbered data tracks is greater than the defined track pitch 516. In one implementation, a ratio of track width of odd-numbered data tracks to the track width of even-numbered data tracks (W1/W2) is between 1.2/1 and 2/1. Other implementations are also contemplated.

In the illustrated system, a data write to any of the interlaced (e.g., even-numbered data tracks) overwrites and effectively "trims" edges of adjacent odd-numbered tracks. For example, the data track 504 overwrites edges of the data tracks 503 and 505 in narrow overlap regions where the data of data tracks 503 and 505 "bleeds" over the natural track boundaries. Consequently, data bits of the narrow data track 504 may overwrite the right-most edges of data bits of the wider written data track 503 and the left-most edges of data bits of the wider written data track 505. Even though each of the narrow written data tracks overwrites the edge portions of data in the adjacent wider written data tracks, a readable portion of the data of the wider written tracks is retained in the center region of each of the wider written data tracks. Therefore, a bit error rate (BER) of the wider written data tracks 503 and 505 may be substantially unaltered by the data write to the data track 504.

In at least one implementation, the wider written data tracks (e.g., the odd-numbered data tracks) include data stored at a different linear density than a linear density of data stored in the narrower written data tracks (e.g., even-numbered data tracks). This allows for an increase in total ADC as compared to a system that uses a common linear density for a consecutive grouping of data tracks.

Notably, a random re-write of the data of one of the wider written data tracks (e.g., the data track 503) may overwrite and substantially affect readability of data in adjacent even-numbered data tracks (e.g., the data track 502). Therefore, a data management method utilizing PRA rules is employed to ensure that groupings of adjacent data tracks are written in an order such that all data of all tracks are readable and total read/write processing time is mitigated.

According to one implementation, a data management method includes multiple phases, with different PRA rules applicable during each phase. The data management method may govern data writes to the entire magnetic disc 500, or (alternatively) govern data writes to a subset of the magnetic disc 500, such as a radial zone of the magnetic disc 500.

In a first phase, data is written exclusively to alternating tracks at a high linear density. For example, the odd-numbered data tracks with a wide written track width may be written to sequentially, as illustrated by the notation "write 1", "write 2", "write 3" and "write 4" in FIG. 5. This first phase continues until a first capacity condition is satisfied. For example, the first capacity condition may be satisfied when 50% of the data tracks in a region (e.g., a specific radial or zone or the entire disc surface) store data. During this first phase of the data management method, each of the odd-numbered data tracks can be written to at random and directly overwritten without re-writing any data of adjacent data tracks.

After the first capacity condition is satisfied, a second phase of the data management method commences. During the second phase of the data management method, data writes may be directed to even-numbered data tracks. The even-numbered data tracks are written to at a lower linear density (e.g., narrower track width), and may be individually written at random (e.g., without re-writing data of any adjacent data tracks).

During the second phase, some odd-numbered data tracks may be written to randomly and others may not. For example, the data track 503 remains randomly writeable up until the point in time when data is first written to either of adjacent data tracks 502 or 504. If an odd-numbered data track is bounded by a data track including data, the odd-numbered data track is no longer randomly writeable. For example, updating data of the data track 503 may entail reading, caching, and subsequently re-writing the data of the adjacent data tracks 502 and 504 (if 502 and 504 contain data).

In one implementation, every other even-numbered data track is left blank for a period of time while the disk continues to fill up. For example, data is initially written to tracks 504 and 508 (per "write 5" and "write 6", respectively), but no data is written to any of tracks 502, 506, or 510. So long as every-other even-numbered data track is left blank, non-random data writes entail writing no more than two data tracks at once. For example, overwriting the data track 503 entails (1) reading data track 502 to a temporary cache location; (2) writing the data track 503; and (3) re-writing the data track 502 after the write of data track 503 is complete.

In some implementations, the data management method entails a third phase that commences once a second, different capacity condition is satisfied. For example, the third phase may commence after data is stored in all alternating even-numbered data tracks. A data management method including a third phase of PRA is discussed with respect to FIG. 5, below.

Figure 6:
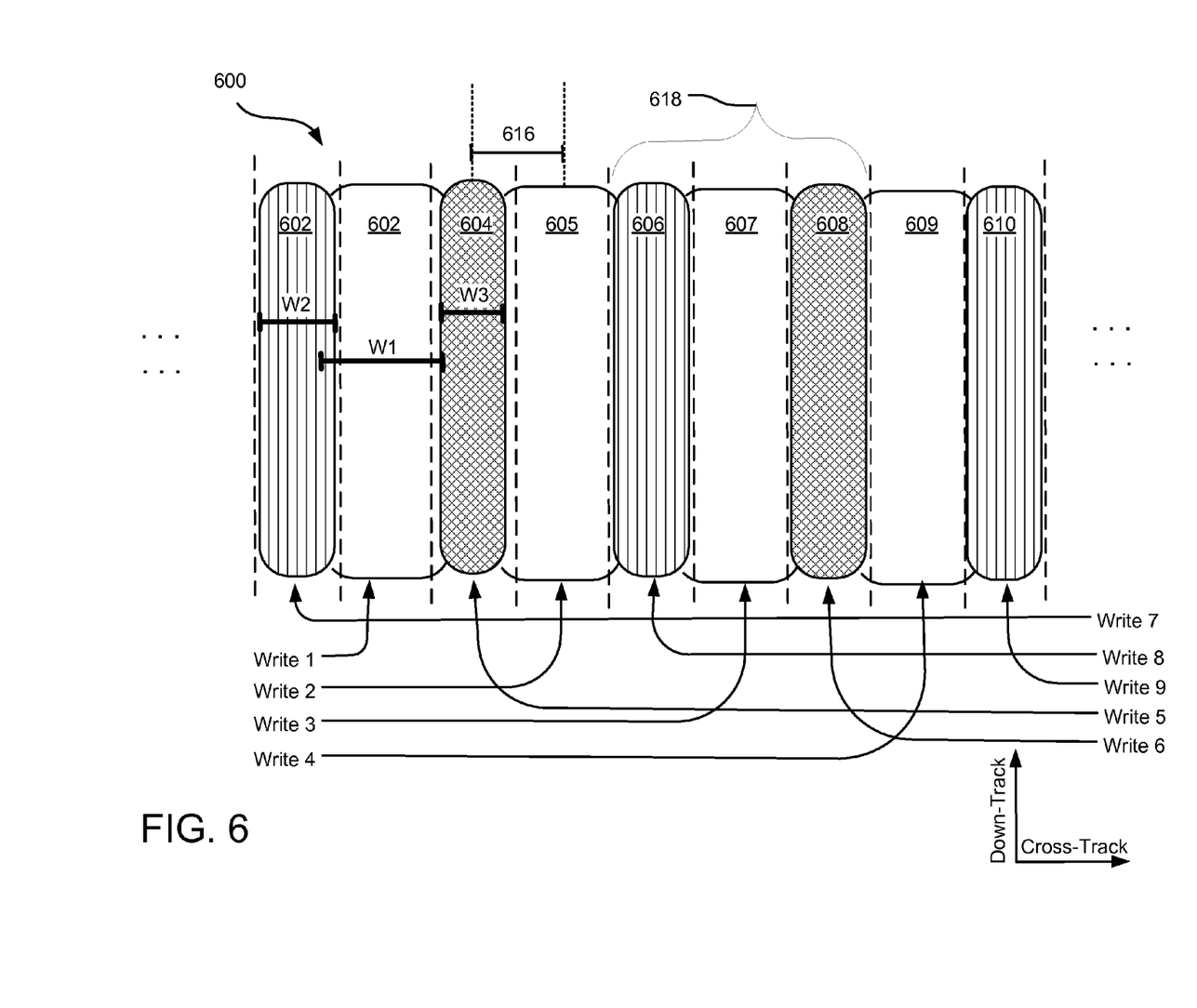
FIG. 6 illustrates data writes employing another example PRA scheme in an IMR system.

FIG. 6 illustrates data writes 600 employing another example PRA scheme in an IMR system. During a first phase of the data management method, the controller directs the new incoming data sequentially to alternating data tracks (e.g., odd-numbered data tracks), such as in the order denoted by "write 1", "write 2", "write 3", and "write 4." The controller continues filling the alternating data tracks with data in this manner until a first capacity condition is satisfied. After the first capacity condition is satisfied, a second phase of the data management method commences and the controller begins to direct new incoming data to every other even-numbered data track (e.g., via "write 5" and "write 6," as shown).

After a second capacity condition is satisfied, a third phase of the data management method commences and the controller begins to direct incoming data to the remaining un-filled data tracks (e.g., "write 7," "write 8," and "write 9", as shown). For example, the second capacity condition may be satisfied when the magnetic disc 600 stores data on 75% of the data tracks.

During the third phase of the data management method, a write operation to update a data track entails reading and writing no more than three data tracks. For example, a write of the data track 605 entails (1) reading data tracks 604 and 606 to a temporary cache location; (2) writing the data track 605; and (3) subsequently re-writing the data tracks 604 and 606. Therefore, reading and writing data during the third phase results in higher performance loss that reading and writing data during the second and first phases. For example, writing data to the data track 603 during the first phase may take a single revolution of the magnetic disc 600; however, during the third phase, writing data to the data track 603 may take five revolutions of the magnetic disc 600 (e.g., reading the data tracks 602 and 604 into a cache memory location, writing the data track 603, and then re-writing the data tracks 602 and 603). Therefore, performance of the magnetic disc 600 is degraded by up to 80% more in the third phase than in the first phase.

One benefit of this multi-phase write management method is that many storage drives may never be used in the third phase. For example, the average usage capacity of desktop hard drives may be between about 50% and 60%, allowing the storage drive to operate exclusively in the first and second phases of the data write management method. Therefore, the multi-phase write management method greatly enhances performance in these systems as compared to systems using SMR.

In FIG. 6, the data tracks written to in the first phase (e.g., the odd-numbered data tracks) have a first linear density and track width (W1); the data tracks written to in the second phase (e.g., the data tracks 602, 606, and 610) have a second linear density and track width (W2); and the data tracks written to in the third phase (e.g., the data tracks 604 and 608) have a third linear density and track width (W3). In at least one implementation, the data tracks receiving the new data in various different phases are of the same linear density and/or track width. Thus, depending on the implementation, W2 may be the same or different from W3 and the data track 604 may be of the same or a different linear density from the data track 602.

One consequence of the illustrated data management method is that an update of data to a single track never entails writing data to more than three data tracks (e.g., an odd-numbered data track and the two adjacent even-numbered data tracks). This reduces back-end processing as compared to shingled magnetic recording (SMR) systems that read and write data in groups of "bands" including several (e.g., 10 or more) data tracks. Also unlike shingled magnetic recording systems, the illustrated write methodology allows for the narrow, alternating data tracks (e.g., the even-numbered data tracks) to be written to at random (e.g., as a single-track write) throughout the life of the drive, and for odd-numbered data tracks to be written to at random for least some period of time as the magnetic disc 600 is filled with data. Thus, the disclosed system provides for a higher data rate and increased system performance as compared to SMR systems.

Figure 7:
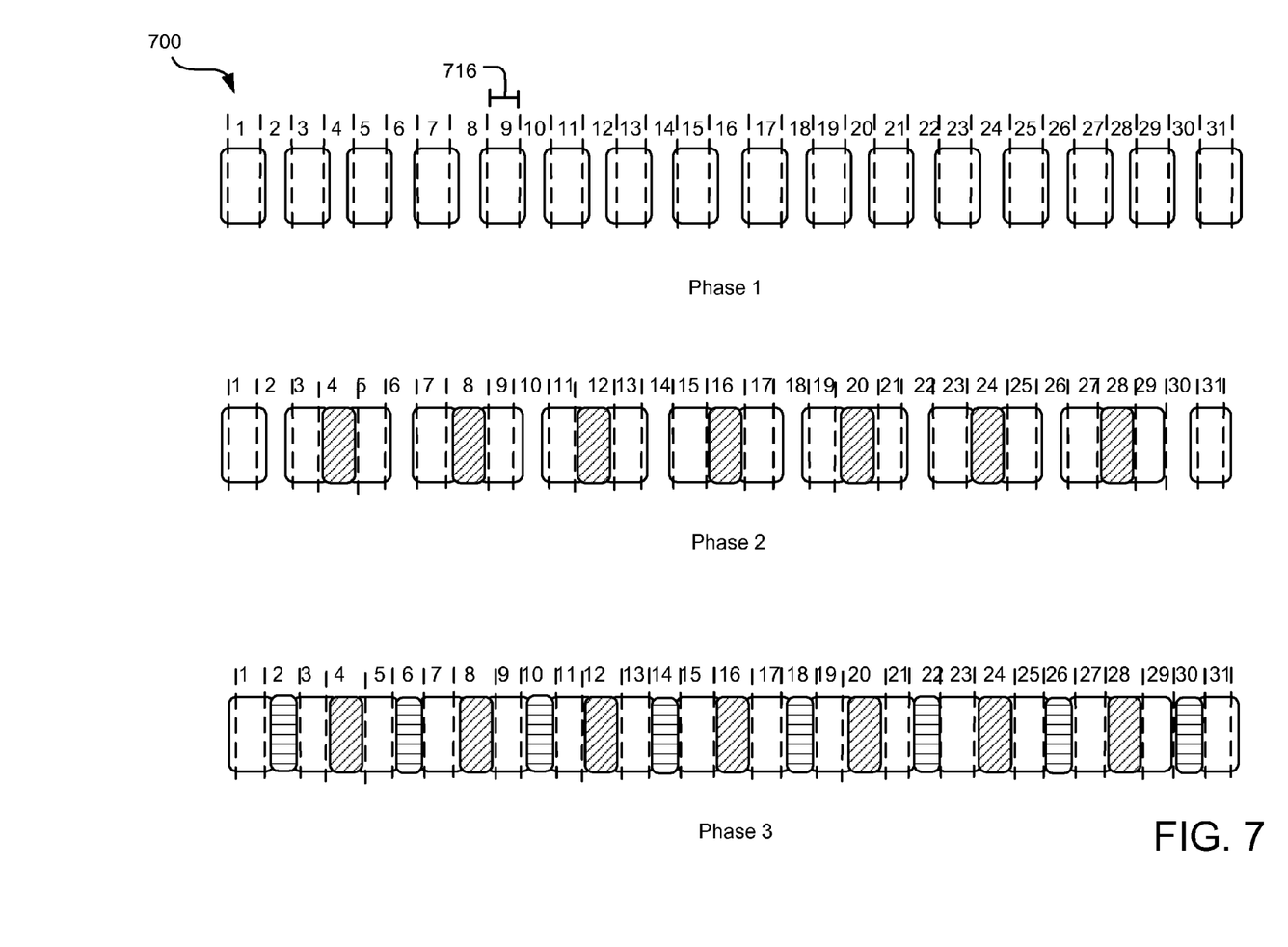
FIG. 7 illustrates an example multi-phase write management method for writing to a region of a magnetic storage medium of an IMR system.

FIG. 7 illustrates an example multi-phase write management method for writing to a region 700 of a magnetic storage medium of an IMR system. The region may be, for example, an entire surface of the magnetic storage medium, multiple surfaces of the magnetic storage medium, or a radial zone on the magnetic medium. During a first phase of the write management method (as indicated by the notation "phase 1"), a storage device controller sequentially writes new data to a first series of data tracks defined by (2n+1), where n is an integer series n=[0, 1, 2, 3, 4 . . . ]. Each data track in the first series of data tracks has a written track width that is slightly wider than a defined track pitch 716. Because the written track width is so wide, a linear density of the first series of data tracks may be higher than a linear density of other subsequently written data tracks of narrower written width.

The storage device continues writing to data tracks in the series (2n+1) until a first capacity condition is satisfied. In one implementation, the first capacity condition is satisfied when 50% of all data tracks in the region 700 include data. In another implementation, the capacity condition is satisfied when a capacity of the region 700 reaches a predetermined threshold, such as 50-65% of a total capacity of the region 700.

Once the first capacity condition is satisfied, a second phase of the write management method commences (as indicated by the notation "phase 2"). During the second phase of the write management method, the storage device controller directs new data to a second series of data tracks defined by (4n), including every-other even-numbered data track (e.g., data tracks 4, 8, 12, etc.). Each data track in the second series of data tracks has a written track width that is equal to or slightly less than the defined track pitch 716. A linear density of the second series of data tracks (e.g., the 4n series) may be less than a linear density of the first series of data tracks (e.g., the 2n+1 series). Therefore, each data track in the second series overwrites edges of data in the adjacent data tracks of the first series.

The storage device continues writing to data tracks in the series 4n until a second capacity condition is satisfied. The second capacity condition may be satisfied when, for example, data is stored in about 50-75% of data tracks in the region 700. Once the second capacity condition is satisfied, a third phase of the write management method commences (as indicated by the notation "phase 3"). During the third phase of the write management method, the storage device controller directs new data to a third series of data tracks defined by (4n+2), including every fourth data track (e.g., data tracks 2, 6, 10, 14, etc.) on the storage medium or within a radial zone of the storage medium.

In one implementation, each data track in the third series of data tracks (the series 4n+2) has a written track width that is equal to or less than the written track width of data tracks in the second series. A linear density of the third series of data tracks may be less than a linear density of the second series of data tracks (e.g., the 4n).

The storage device continues writing to data tracks in the third series (4n+2) until the region 700 reaches a maximum capacity (at or near 100% of an advertised capacity for the disc or for a particular radial zone).

Figure 8:
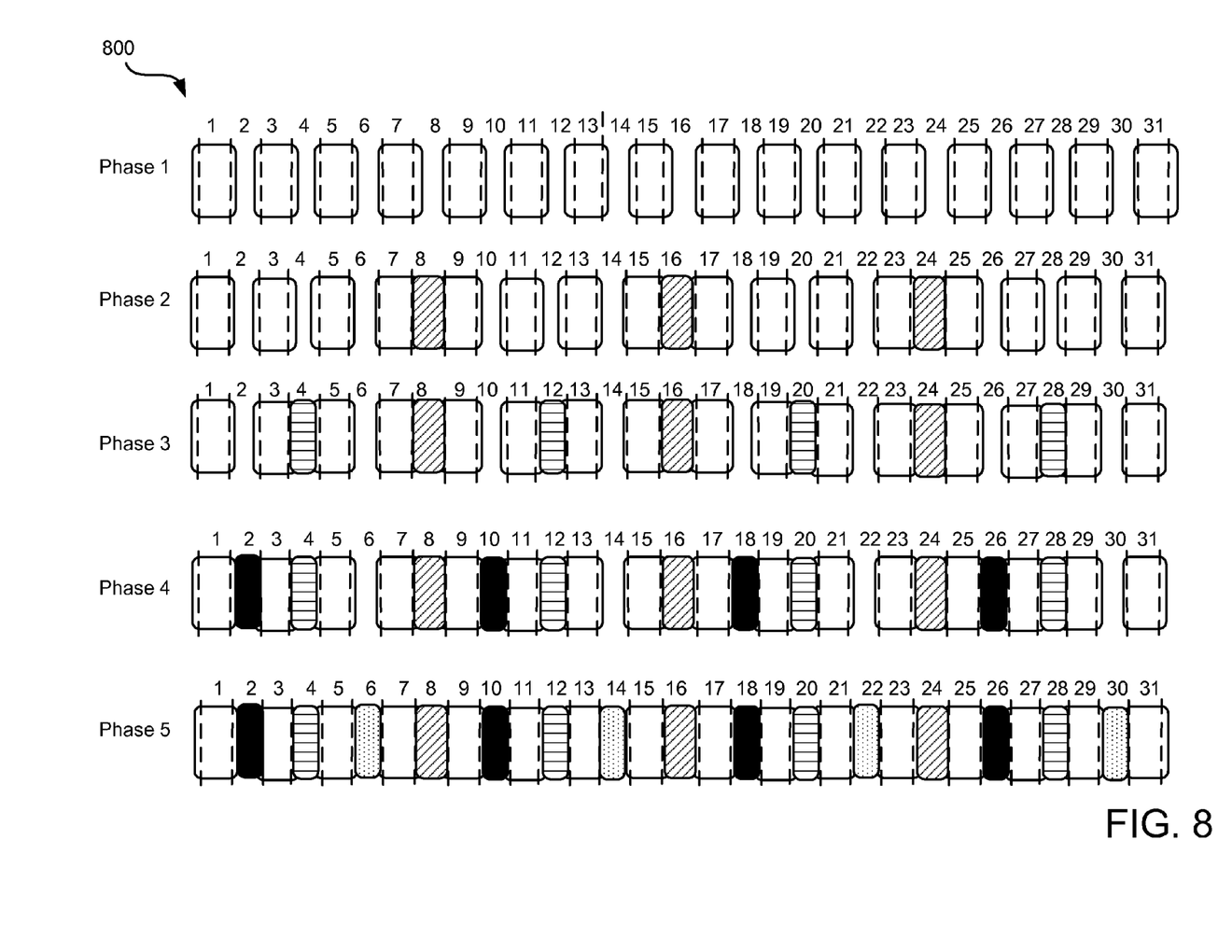
FIG. 8 illustrates another example multi-phase write management method for writing to a region of a magnetic storage medium of an IMR system.

FIG. 8 illustrates another example five-phase write management for writing to a region 800 of a magnetic storage medium of an IMR system. The region may be, for example, an entire surface of the magnetic medium, multiple surfaces of the magnetic medium, or a radial zone on the magnetic medium. During a first phase of the write management method (as indicated by the notation "phase 1"), a storage device controller sequentially writes new data to a first series of data tracks defined by (2n+1), where n is an integer series n=[0, 1, 2, 3, 4 . . . ]. For example, the first capacity condition may be satisfied when data is stored in about 50% of data tracks in the region 800.

Once the first capacity condition is satisfied, a second phase of the write management method commences (as indicated by the notation "phase 2"). During the second phase of the write management method, the storage device controller directs new data to a second series of data tracks defined by (8n), including every $8^{th}$ data track in the consecutive series of data tracks (e.g., the data tracks 8, 16, 24, etc).

The storage device continues writing to data tracks in the series 8n until a second capacity condition is satisfied. The second capacity condition may be satisfied when, for example, data is stored in about 50-62.5% of data tracks in the region 800.

Once the second capacity condition is satisfied, a third phase of the write management method commences (as indicated by the notation "phase 3"). During the third phase of the write management method, the storage device controller directs new data to a third series of data tracks defined by (8n+4), including the data tracks 4, 12, 20, etc.

The storage device continues writing to data tracks in the third series 8n+4 until a third capacity condition is satisfied. The third capacity condition may be satisfied when, for example, data is stored in about 62.5-75% in the region 800.

Once the third capacity condition is satisfied, a fourth phase of the write management method commences (as indicated by the notation "phase 4"). During the fourth phase of the write management method, the storage device controller directs new data to a fourth series of data tracks defined by (8n+2), including the data tracks 2, 10, 18, 26, etc. The storage device continues writing to data tracks in the fourth series 8n+2 until a fourth capacity condition is satisfied. The fourth capacity condition may be satisfied when, for example, data is stored in about 75-87% of data tracks in the region 800.

Once the fourth capacity condition is satisfied, a fifth phase of the write management method commences (as indicated by the notation "phase 5"). During the fifth phase of the write management method, the storage device controller directs new data to a third series of data tracks defined by (8n+6), including the data tracks 6, 14, 22, etc. The storage device continues writing to data tracks in the fifth series 8n+6 until the maximum capacity of the region 800 is attained.

Each individual series of data tracks (e.g., the series 2n+1, 8n, 8n+4, 8n+2, 8n+6) have a same density and track width. For example, the data tracks defined by 2n+1 (phase 1) have a first linear density and track width, the data tracks defined by $8n$ have a second linear density and track width, etc. In one implementation, the written track width and/or linear density of each series of data tracks decreases in the following order: phase 1 (2n+1 series); phase 2 (8n series); phase 3 (8n+4 series); phase 4 (8n+2 series); phase 5 (8n+6 series). In still other implementations, data tracks in two or more of the various series have a same linear density and track width. By varying linear densities of different orders of interlaced traced, higher areal density capacities can be achieved.

Still other implementations may implement additional high-orders of interlaced magnetic recording than those shown in FIG. 7 or 8. For example, another implementation may manage the interlaced data in series defined by: 16n, 16n+8, 16n+4, 16n+12, 16n+2, 16n+6, 16n+10, and 16n+14.

Figure 9:
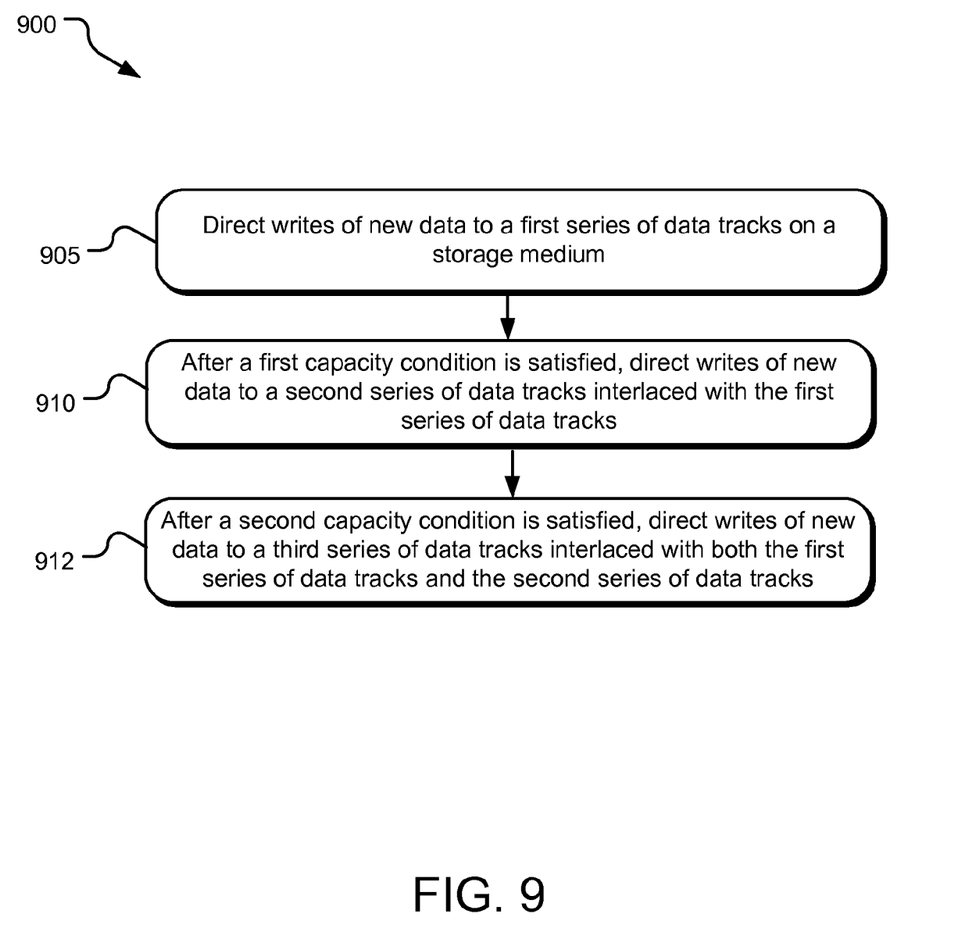
FIG. 9 illustrates example operations for employing a PRA scheme in an IMR system.

FIG. 9 illustrates example operations for employing a PRA scheme in an IMR system. A first direction operation 905 directs writes of new, incoming data to a first series of data tracks on the storage medium. Each data track in the first series of data tracks is separated from the other data tracks in the first series by one or more interlaced data tracks.

After a first capacity condition is satisfied, a second direction operation 910 directs incoming writes of new data to a second series of data tracks interlaced with the first series of data tracks. According to one implementation, the second series of data tracks has a narrower track width and includes data of a lower linear density than the first series of data tracks.

After a second capacity condition is satisfied, yet another direction operation 912 directs incoming writes of new data to a third series of data tracks interlaced with both the first and the second series of data tracks. The data written to the third series of data tracks may be at a same or a different linear density and/or track width than the data of the second series of data tracks. In one implementation, the third series of data tracks has a narrower track width and includes data of a lower linear density than the second series of data tracks.

Figure 10:
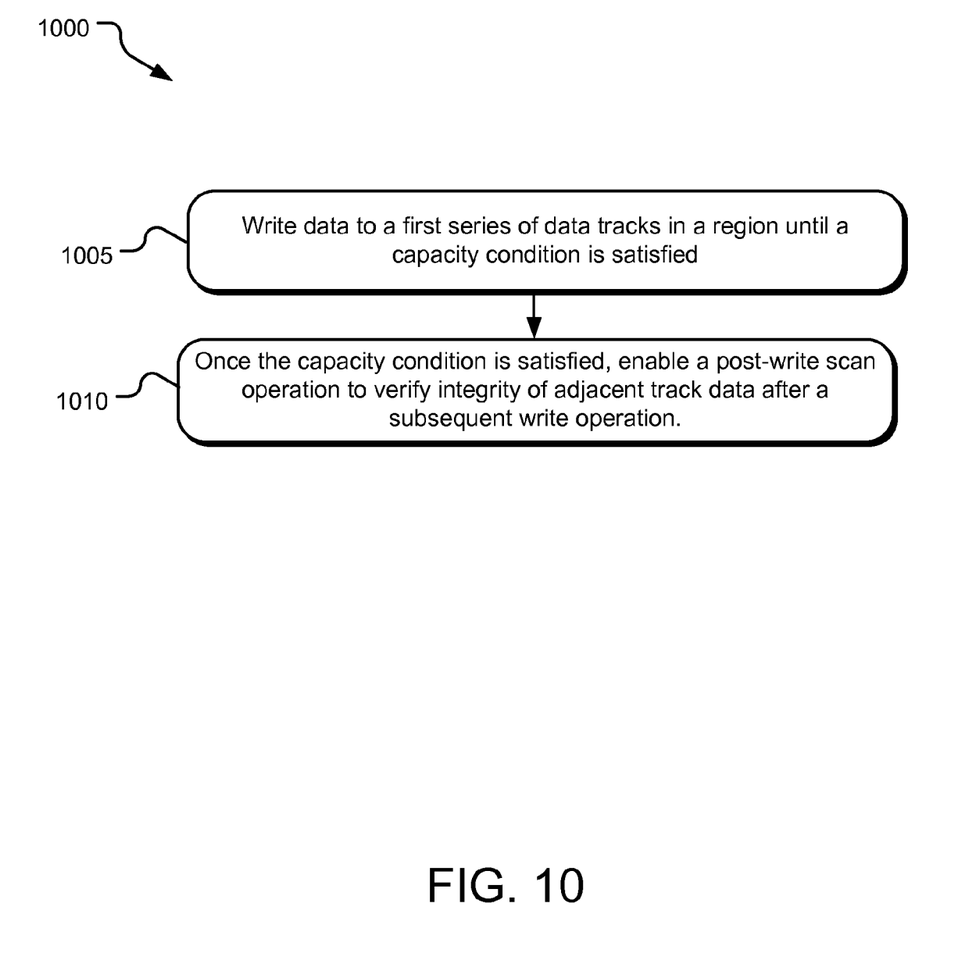
FIG. 10 illustrates example operations for employing another example PRA scheme.

FIG. 10 illustrates example operations 1000 for employing another PRA scheme. The example operations 1000 may be implemented in any type of magnetic recording device including without limitation CMR and IMR devices.

A write operation 1005 writes data to a first series of data tracks until a capacity condition is satisfied. The first series of data tracks are each separated from one another by at least one interlaced data track. For example, the first series of data tracks may be alternating data tracks and tracks interlaced with the alternating data tracks are left blank until the first capacity condition is satisfied. The capacity condition may be, for example, a predetermined number of data tracks storing data within the region, a threshold capacity of the region, etc.

So long as the capacity is not satisfied (e.g., capacity of the region is below a threshold), the magnetic recording device does not perform any post-write scan operations such as incrementing or resetting write counters and/or performing DOSs to verify integrity of stored data. Once the capacity condition is satisfied, an enabling operation 1010 enables post-write scan operations.

When the post-write scan operations are enabled, a write operation to any particular data track increases a write counter associated with each immediately adjacent data track. When the write counter for a particular data track exceeds a threshold, the data track is subjected to a DOS. The DOS reads data of the data track and determines whether a number of correctable read errors satisfies an error threshold. If the number of correctable read errors satisfies the error threshold, the storage device controller re-writes the data of that data track and resets the write counter of the data track to a default starting value.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. Apparatus comprising:
    storage device controller configured to:
    responsive to receipt of a write command specifying new data, determine whether a first capacity condition is satisfied; and write new data exclusively to data tracks in a first series of data tracks on a storage medium if the first capacity is not satisfied, each of the data tracks of the first series being interlaced with data tracks of a second series.

2. The apparatus of claim 1, wherein the first series of data tracks is a series of alternating data tracks.

3. The apparatus of claim 1, wherein the storage device controller writes new data to data tracks in a third series of data tracks on the storage medium after a second capacity condition is satisfied, wherein the data tracks in the third series are each separated from one another by at least one track of the first series and at least one track of the second series.

4. The apparatus of claim 3, wherein the first series of data tracks and the second series of data tracks are in a same region of the storage medium and a capacity of the same region is higher when the second capacity condition is satisfied than when the first capacity condition is satisfied.

5. The apparatus of claim 3, wherein the new data stored in the third series of data tracks is at a different linear density that the new data stored in either of the first series of data tracks and the second series of data tracks.

6. The apparatus of claim 1, wherein the new data stored in the first series of data tracks is at a higher linear density than the new data stored in the second series of data tracks.

7. The apparatus of claim 1, wherein the first series of data tracks and the second series of data tracks have different written track widths.

8. A method comprising:
    responsive to receipt of a write command specifying new data, determining whether a first capacity condition is satisfied;
    writing the new data exclusively to data tracks in a first series of data tracks on a storage medium if the first capacity is not satisfied; and
    writing the new data exclusively to data tracks in a second series of data tracks on the storage medium if capacity condition is satisfied, each of the data tracks of the second series being interlaced with data tracks of the first series.

9. The method claim 8, wherein the first series of data tracks is a series of alternating data tracks.

10. The method of claim 8, further comprising:
    writing data to data tracks in a third series of data tracks on the storage medium after a second capacity condition is satisfied, wherein the data tracks in the third series are each separated from one another by at least one track of the first series and at least one track of the second series.

11. The method of claim 10, wherein the first series of data tracks and the second series of data tracks are in a same region of the storage medium and a capacity of the same region is higher when the second capacity condition is satisfied than when the first capacity condition is satisfied.

12. The method of claim 10, wherein the new data stored in the third series of data tracks is at a different linear density that the new data stored in either of the first series of data tracks and the second series of data tracks.

13. The method of claim 8, wherein the new data stored in the first series of data tracks is at a higher linear density than the new data stored in the second series of data tracks.

14. The method of claim 8, wherein the first series of data tracks and the second series of data tracks have different written track widths.

15. The apparatus of claim 1, wherein the storage device controller is further configured to write the new data exclusively to data tracks in the second series of data tracks on the storage medium if the capacity condition is satisfied.

16. One or more tangible computer-readable storage media encoding computer-executable instructions for executing on a computer system a computer process, the computer process comprising:
    responsive to receipt of a write command specifying new data, determining whether a first capacity condition is satisfied; and
    writing the new data exclusively to data tracks in a first series of data tracks on a storage medium if the first capacity is not satisfied, each of the data tracks of the first series being interlaced with data tracks of a second series.

17. The one or more computer-readable storage media of claim 16, wherein the computer process further comprises writing the new data exclusively to data tracks in the second series of data tracks on the storage medium if the capacity condition is satisfied.

18. The one or more computer-readable storage media of claim 16, wherein the first series of data tracks is a series of alternating data tracks.

19. The one or more computer-readable storage media of claim 16, wherein the first series of data tracks and the second series of data tracks are in a same region of the storage medium and a capacity of the same region is higher when the second capacity condition is satisfied than when the first capacity condition is satisfied.

* * * * *